(12) United States Patent
David

(10) Patent No.: US 11,804,132 B2
(45) Date of Patent: Oct. 31, 2023

(54) SYSTEMS AND METHODS FOR DISPLAYING BIRD'S EYE VIEW OF A ROADWAY

(71) Applicant: Toyota Motor Engineering & Manufacturing North America, Inc., Plano, TX (US)

(72) Inventor: Mikio David, Ypsilanti, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 140 days.

(21) Appl. No.: 17/344,277

(22) Filed: Jun. 10, 2021

(65) Prior Publication Data

US 2022/0398925 A1   Dec. 15, 2022

(51) Int. Cl.

| | |
|---|---|
| *G08G 1/0967* | (2006.01) |
| *G06T 11/00* | (2006.01) |
| *B60K 35/00* | (2006.01) |
| *G06F 3/14* | (2006.01) |
| *G08G 1/052* | (2006.01) |
| *G01C 21/36* | (2006.01) |

(Continued)

(52) U.S. Cl.
CPC ....... *G08G 1/096791* (2013.01); *B60K 35/00* (2013.01); *G06F 3/14* (2013.01); *G06T 11/00* (2013.01); *G08G 1/052* (2013.01); *G08G 1/096741* (2013.01); *B60K 2370/166* (2019.05); *B60K 2370/21* (2019.05); *G01C 21/3691* (2013.01); *G01C 21/3841* (2020.08); *G06T 2207/30236* (2013.01); *G06T 2207/30242* (2013.01); *G06T 2207/30261* (2013.01); *H04N 23/90* (2023.01)

(58) Field of Classification Search
None
See application file for complete search history.

(56) References Cited

U.S. PATENT DOCUMENTS

| | | |
|---|---|---|
| 8,384,782 B2 | 2/2013 | Hiroshi |
| 9,031,089 B2 | 5/2015 | Rubin et al. |
| 10,032,369 B2 | 7/2018 | Koravadi |

(Continued)

FOREIGN PATENT DOCUMENTS

| | | |
|---|---|---|
| DE | 102011122297 A1 | 6/2013 |
| DE | 102017122261 A1 * | 3/2019 |
| DE | 102017122261 A1 | 3/2019 |

OTHER PUBLICATIONS

What you need to know about v2v technology (https://blog.rgbsi.com/what-to-know-about-v2v-technology), Apr. 2, 2021.

*Primary Examiner* — David H Chu
(74) *Attorney, Agent, or Firm* — DINSMORE & SHOHL LLP

(57) ABSTRACT

A vehicle navigation system includes an electronic control unit. The electronic control unit receives image data regarding a source of a traffic jam on a roadway from a plurality of sensors of a plurality of vehicles in a mesh network. Moreover, the electronic control unit generates a bird's eye view of the traffic jam based on the image data, wherein the bird's eye view includes a graphical representation of the source of the traffic jam and a graphical representation of vehicles on the roadway within the traffic jam. A display device displays the bird's eye view.

18 Claims, 4 Drawing Sheets

(51) Int. Cl.
  *G01C 21/00* (2006.01)
  *H04N 23/90* (2023.01)

(56) References Cited

U.S. PATENT DOCUMENTS

| | | | |
|---|---|---|---|
| 10,304,338 B1 | 5/2019 | Lau et al. | |
| 10,318,821 B2 | 6/2019 | Kim et al. | |
| 10,832,567 B2 | 11/2020 | Edwards | |
| 2003/0154017 A1* | 8/2003 | Ellis | A61H 3/068 |
| | | | 701/422 |
| 2005/0033505 A1* | 2/2005 | Zatz | G08G 1/04 |
| | | | 340/905 |
| 2009/0062975 A1* | 3/2009 | Strzeletz | G01C 21/26 |
| | | | 701/26 |
| 2012/0268295 A1* | 10/2012 | Yuse | G08G 1/0104 |
| | | | 340/905 |
| 2016/0042234 A1* | 2/2016 | Chen | G08G 1/04 |
| | | | 382/190 |
| 2016/0063032 A1* | 3/2016 | Kishore | G01C 21/3697 |
| | | | 701/532 |
| 2016/0210853 A1* | 7/2016 | Koravadi | G06V 20/56 |
| 2016/0275786 A1* | 9/2016 | Fowe | G08G 1/0141 |
| 2017/0254653 A1* | 9/2017 | Min | G08G 1/096811 |
| 2019/0002124 A1* | 1/2019 | Garvin | B64U 10/13 |
| 2019/0020377 A1* | 1/2019 | Jiang | G06K 7/10128 |
| 2020/0242922 A1* | 7/2020 | Dulberg | G08G 1/012 |
| 2021/0004909 A1* | 1/2021 | Farmer | G06Q 40/08 |
| 2021/0232340 A1* | 7/2021 | Ito | G06F 3/0653 |
| 2021/0269149 A1* | 9/2021 | Culver | B64U 50/34 |
| 2022/0284514 A1* | 9/2022 | Brandmaier | G08G 1/0112 |

\* cited by examiner

SYSTEMS AND METHODS FOR DISPLAYING BIRD'S EYE VIEW OF A ROADWAY

TECHNICAL FIELD

The present specification generally relates to displaying information on display devices of vehicles and, more specifically, the present disclosure provides systems and methods for displaying a bird's-eye-view of a traffic condition.

BACKGROUND

Drivers of vehicles can be caught in traffic delays. Such delays can be caused by a wide range of events, including accidents, construction, debris in a roadway, or other events. Drivers away from a source of a traffic condition may not be able to view the traffic condition of the condition, the distance until the condition is cleared, or a line in which traffic may be moving. This can lead to frustration and delay.

Accordingly, there is a need for systems and methods that improve driving experiences, increase information available to a driver, and otherwise improve upon vehicles.

SUMMARY

In one embodiment, a vehicle navigation system includes an electronic control unit. The electronic control unit is configured to receive image data regarding a source of a traffic jam on a roadway from a plurality of sensors of a plurality of vehicles in a mesh network. Moreover, the electronic control unit can generate a bird's eye view of the traffic jam based on the image data, wherein the bird's eye view includes a graphical representation of the source of the traffic jam and a graphical representation of vehicles on the roadway within the traffic jam.

In one embodiment, a method implemented by a vehicle navigation system includes receiving image data regarding a source of a traffic jam on a roadway from a plurality of sensors of a plurality of vehicles in a mesh network. The method further includes determining a number of vehicles on the roadway within the traffic jam based on the image data, and generating a bird's eye view of the traffic jam based on the image data, wherein the bird's eye view includes a graphical representation of the source of the traffic jam, an identification of the number of vehicles on the roadway, and an identification of an obstruction as the source of the traffic jam. Further, the method can include displaying the bird's eye view of the traffic jam on a display device.

In another embodiment, a vehicle navigation system includes an electronic control unit. The electronic control unit is configured to receive, via a first sensor, image data of a source of a traffic jam, and receive, via a second sensor, image data of a portion of the traffic jam a distance from the source, wherein the second sensor is a greater distance from the source of the traffic jam than the first sensor. The electronic control unit can determine an obstruction as the source of the traffic jam based on analysis of the image data of the source. Further, the electronic control unit can generate a graphical image of a bird's eye view of the traffic jam based on the image data of the source and the image data of the portion of the traffic jam.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for generating a bird's eye view of a road way under a traffic jam condition. Embodiments include a plurality of vehicles communicatively connected via a mesh network, such as a vehicle to vehicle ("V2V") network. Vehicles can include computing device or an electronic control unit configured to capture image data with a sensor, such as a camera. Methods may receive image data from a plurality of vehicles and may generate a bird's eye view or aerial view of the road way and source of the traffic jam. For example, vehicles near the source of a traffic jam (e.g., an accident, construction, debris, etc.) may share image data regarding an obstruction as the source of the traffic jam. Other vehicles may share image data of different locations along the roadway. This image data can be transformed into the bird's eye view. Accordingly, passengers of the vehicle may have a better understanding as to the traffic condition and state of the traffic jam.

The bird's eye view may include an animation of current traffic status with information on number of vehicles, speed, obstructions, type of vehicles (e.g., trucks, ambulances, SUV, motorcycles etc.). In some embodiment, vehicles in the traffic jam may send image data to a remote server (e.g., the cloud). The remote server may then generate the bird's eye view and transmit the bird's eye view to connected vehicles in the traffic jam.

Figure 1:
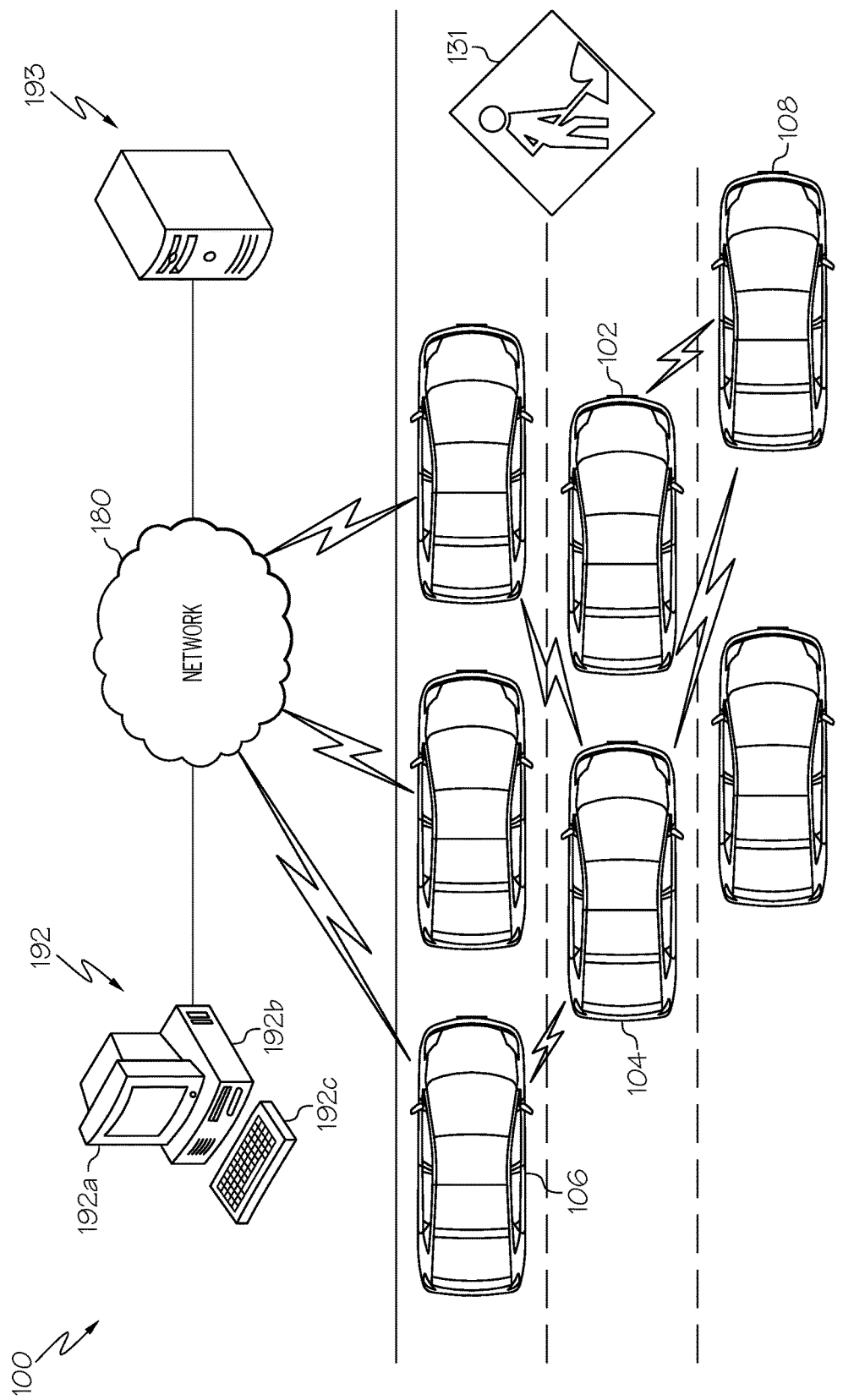
FIG. 1 depicts an illustrative embodiment of an operating environment for a vehicle navigation system including vehicles communicating via a network according to one or more embodiments shown and described herein.

Turning now to the drawings, where like numbers refer to like structures, and particularly to FIG. 1, an illustrative embodiment of an environment 100 for a vehicle 106 traveling along a roadway. The environment 100 can include a plurality of vehicles, such as first vehicle 102, second vehicle 104, and third vehicle 108 navigating along the roadway. It is noted that any appropriate number of vehicles may be included on the roadway. Vehicles can capture image data taken from their respective locations. The image data can be shared and a bird's eye view of the environment 100 may be generated from the images.

The environment 100 can be a roadway, parking garage, parking lot, or other appropriate locations. Further an obstruction 131 may be at the source of a traffic jam. The traffic condition of the traffic jam can include any appropriate traffic condition, such as an accident or construction. Other traffic conditions can include objects on a roadway, such as a disabled vehicle or debris (e.g., objects fallen from vehicles, natural objects such as animals or trees, etc.), or the like. It is further noted that the obstruction 131 can be located in one or more lanes of a roadway, exits of a parking location, or the like.

In embodiments, vehicles within the network 100 may capture image data and transmit image data via a network 180. For instance, the vehicles within the environment 100 may be communicatively coupled via the network 180. The network 180 can include a wireless network. Connected vehicles can include communication units that may comprise one or more network interface devices, telematics units, or the like. For instance, a communications unit may be a dual carrier module (DCM) that includes network interfaces for communicating via different access protocols, different duplexing schemes, in disparate frequency bands, etc. Such network interfaces may include Wi-Fi, $x^{th}$ generation cellular technology (e.g., 2G, 3G, 4G, 5G, etc.), WCDMA, LTE, LTE Advanced, ZigBee, Bluetooth, WiMAX, UMTS, code-division multiple access (CDMA), C-V2X, Global System for Mobile Communications (GSM), or the like.

As described in more detail herein, the network 180 (optionally implemented by a computing device 192) may establish, control, and optimize a mesh network between each of the vehicles, for example, the first vehicle 102, the second vehicle 104, the third vehicle 108, and the target vehicle 108. The computing device 192 may include a display 192*a*, a processing unit 192*b* and an input device 192*c*, each of which may be communicatively coupled together. The processing unit 192*b* may include a processor, input/output hardware, network interface hardware, a data storage, and a memory component. The server 193 may have a similar configuration as the computing device 192, but optionally configured to operate as a data storage and application support device.

Figure 2:
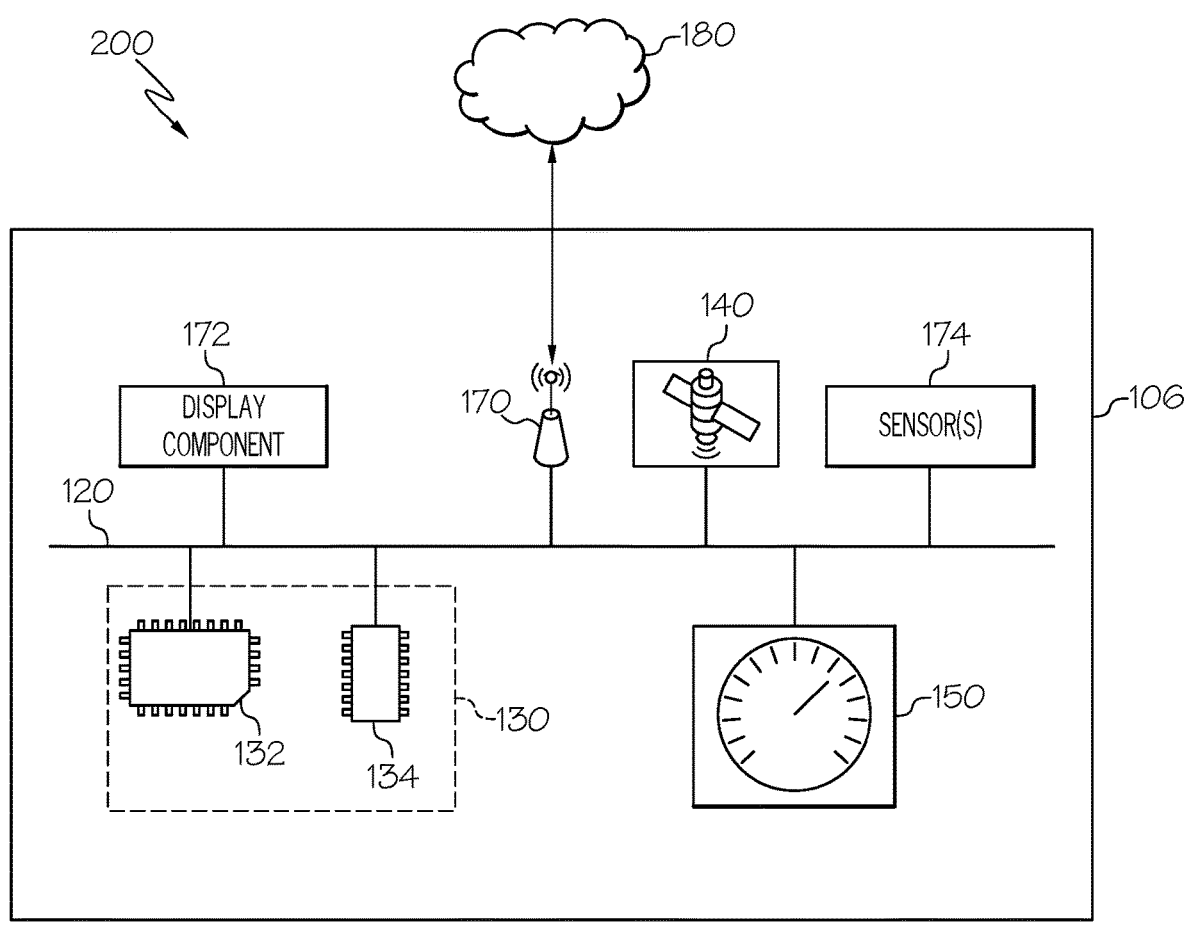
FIG. 2 schematically depicts components of a vehicle according to one or more embodiments shown and described herein.

Turning to FIG. 2, with reference to FIG. 1, an example schematic of a portion of a vehicle (vehicle 106) including sensor resources and a computing device is depicted. It is noted that other vehicles (first vehicle 102, second vehicle 104, and/or third vehicle 108) within the environment 100 may be equipped with the same, similar, or different sets of sensor resources, telematics resources, or the like. In at least some embodiments, the vehicle 106 may include a computing device and/or an electronic control unit 130 comprising a processor 132 and a non-transitory computer readable memory 134, a navigation unit 140 (e.g., global positioning system (GPS), compass, etc.), a vehicle sensor(s) 174 (e.g., vehicle speed sensors, motion sensors, proximity sensors, etc.), a display component 172, and a communications unit 170. These and other components of the vehicle 106 may be communicatively connected to each other via a communication bus 120.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverse. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the vehicle 106 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. It is further noted that the processor 132 may comprise a single processor, multiple processors, or a system of processors.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. It is noted that the non-transitory computer readable memory 134 may include one or more devices, memory modules, or the like.

Still referring to FIG. 2, a navigation unit 140 such as a GPS device, electronic compass, or the like may be coupled to the communication bus 120 and communicatively coupled to the electronic control unit 130 of the vehicle 106. The navigation unit 140 is capable of generating location information and/or heading information indicative of a location of the vehicle 106 by receiving one or more GPS signals from one or more GPS satellites. The navigation unit 140 may be configured to generate heading information, for example, based on an electronic compass. The GPS signal communicated to the electronic control unit 130 via the communication bus 120 may include location information comprising a National Marine Electronics Association (NMEA) message, a latitude and longitude data set, a street address, a name of a known location based on a location database, or the like. Additionally, the navigation unit 140 may be interchangeable with any other systems capable of generating an output indicative of a location. For example, a local positioning system that provides a location based on cellular signals and broadcast towers or a wireless signal detection device capable of triangulating a location by way of wireless signals received from one or more wireless signal antennas.

The vehicle 106 may also include sensor(s) 174 coupled to the communication bus 120 and communicatively coupled to the electronic control unit 130. The sensor(s) 174 may include any sensor or system of sensors, which may include sensors for operate an autonomous vehicle, images sensors (e.g., cameras), or the like. In examples, sensor(s) 174 may be configured for generating a signal indicative of vehicle speed, movement, proximity to other vehicles, etc. For example, without limitation, a vehicle sensor(s) 174 may be a tachometer that is capable of generating a signal indicative of a rotation speed of a shaft of the vehicle 106 engine or a drive shaft. Signals generated by the vehicle sensor(s) 174 may be communicated to the electronic control unit 130 and converted to a vehicle speed value. The vehicle speed value is indicative of the speed of the vehicle 106. In some embodiments, the vehicle sensor(s) 174 comprises an opto-isolator slotted disk sensor, a Hall Effect sensor, a Doppler radar, or the like. In some embodiments, a vehicle sensor(s) 174 may comprise data from a GPS for determining the speed of the vehicle 106. The vehicle sensor(s) 174 may be provided so that the electronic control unit 130 may determine when the vehicle 106 accelerates, maintains a constant speed, slows down or comes to a stop. For example, a vehicle sensor(s) 174 may provide signals to the electronic control unit 130 indicative of vehicle 106 slowing down due to a change in traffic conditions or prior to the vehicle performing a turning maneuver.

According to embodiments, the sensor(s) 174 can include one or more cameras. As described herein, various vehicles (e.g., vehicle 106, first vehicle 102, second vehicle 104, and/or third vehicle 108) can include cameras. Each of the vehicles may be configured to capture images of the environment 100. In the example illustrated in FIG. 1, vehicle 102 and vehicle 108 may be closest to an obstruction 131 at the source of a traffic jam. The vehicles 102 and 108 can capture images of the obstruction 131 via their respective cameras. Vehicle 104 and vehicle 106 may capture, via respective cameras, image data of traffic conditions of the traffic jam at locations greater distances from the source of the traffic jam than the sensors of the first vehicle 102 and the third vehicle 108.

The vehicles can transmit the image data to other vehicles or the remote computer 192 via the network 180. Accordingly, image data may be gathered from a plurality of sensors 174 that may capture images of different angles, locations, or positions along a roadway. In embodiments, the image data can be utilized to generate bird's eye views of the traffic jam, including identification of an obstruction 131 of the traffic jam.

Still referring to FIG. 2, the non-transitory computer readable memory 134 may include or be in communication with a display component 172. The display component 172 may include a display device and/or computer readable instructions (e.g., display component logic) that, when executed by the processor 132, traffic condition the processor 132 to provide functions of the display component 172 described herein. It is further noted that the display component 172 may be implemented within or comprised by one or more devices (e.g., one or more electronic control units), remote devices (e.g., servers, remote computing devices), or the like. While embodiments may refer to a vehicle as comprising the display component 172, it is noted that servers, remote computing devices, or the like may comprise the display component 172.

The display component 176 can be one or more of a heads-up-display (HUD), a three-dimensional HUD device a hologram projection system, a liquid crystal display (LCD), a light emitting diode (LED) display, and the like. The display component 176 can display the bird's eye view, information about objects (e.g., types or classifications, trajectories of objects, etc.), or other information to a user. The display component 176 can be placed in a predetermined location, project images in a predetermined location, or the like. The predetermined location can correspond a dashboard, a windshield, a headset, or in other appropriate locations. Moreover, the display component 176 can comprise an augmented reality display device, such as a three-dimensional heads-up display device.

The electronic control unit 130 may be configured to transmit and/or receive image data from a plurality of sensors, such as sensors from different vehicles within a mesh network (e.g., vehicle 106, first vehicle 102, second vehicle 104, and third vehicle 108). In some examples, image data can be captured by cameras at stationary structures, such as parking garages, traffic cameras, or the like. It is noted that any appropriate number of images from any appropriate source can be received.

The electronic control unit 130 can receive the image data and can identify a source of a traffic jam on a roadway from the image data. The electronic control unit 130 can recognize or identify the obstruction 131 of the traffic jam based on analysis of the image data. For instance, the electronic control unit 130 electronic control unit 130 may apply image recognition algorithms, pattern recognition algorithms, or the like to identify objects, signage (e.g., construction signs, first responder signage, etc.), or the like. In an example, the display electronic control unit 130 can analyze image data to recognize presence of police, ambulance, or other first responder vehicles from the image data. The electronic control unit 130 can further recognize presence of an accident through recognizing damage to vehicles or structures, debris indicative of an accident, skid marks on a roadway, or the like.

In some embodiments, electronic control unit 130 may recognize an obstruction 131 based on artificial intelligence, statistical models, or other processes and/or algorithms to identify objects, traffic situations, or debris, or the like. For instance, the electronic control unit 130 may determine the obstruction 131 based on a weighted model. The weighted model may weigh or balance various relationally applied factors, where weighting and balancing may vary in accordance with machine learning over time. In an example, factors may be applied to determine priority, wherein certain factors are weighted more heavily than other factors in a given services request. The factors may include various conditions identified herein. Embodiments may utilize different or other factors according to a weighted model. For instance, classifiers may be mapped to an attribute vector to a confidence that the attribute belongs to a class. An input attribute vector, x=(x1, x2, x3, x4, xn) may be mapped to f(x)=confidence(class). Such classification can employ a probabilistic and/or statistical based analysis to infer a probability of an obstruction 131. The electronic control unit 130 may determine whether to assign an obstruction 131 based on the probability exceeding a probability threshold (e.g., a percentage, a number of tokens out of possible tokens, etc.). In various embodiments, the electronic control unit 130 may utilize other directed and undirected model classification approaches include, e.g., naive Bayes, Bayesian networks, decision trees, neural networks, fuzzy logic models, and probabilistic classification models providing different patterns of independence. Classification may also include statistical regression that the electronic control unit 130 may utilize to develop image recognition and/or traffic condition recognition models.

In at least some embodiments, the electronic control unit 130 can select which sensors 174 should be utilized for gathering and/or transmitting image data based at least in part on one or more of quality of image data, cleanliness of camera lenses, angles of capture, or the like. In examples, the electronic control unit 130 can select sensors 174 from specific vehicles based on transmission speeds or communication qualities associated with communication components of vehicles. For instance, when two vehicles (e.g., vehicles 102 and 108) can capture image data of the obstruction 131, the electronic control unit 130 may select a vehicle having a highest radio network metric as a target from which to receive image data. The radio network metric may include transmission speed, transmission reliability, or the like. According to at least one embodiment, the electronic control unit 130 can select sensors 174 from specific vehicles based on quality of images. The quality of images may be determined based on a make/model of a vehicle, cleanliness of a camera lens, angle of capture relative the obstruction 131, image analysis, or the like.

The electronic control unit 130 can select sensors 174 from specific target vehicles based on calculated scores according to a weighted model. The weighted model applies weighting factors to weigh parameters for selection, such as radio metric performance, an image quality, an angle of view of the source, or a clarity of sensors. For instance, the electronic control unit 130 can analyze clarities of image data captured by vehicles and calculate scores based at least in part on the clarities. Other scores may be calculated based on angles of images, or the like. The weighted model may be biased and/or trained to apply a greater weight to one or more factors. For instance, in some embodiments, the weighted model may emphasize radio metric performance to increase speed. In other examples, the weighted model may be weighted at times to emphasize image quality. If the obstruction 131 has relatively static or unchanging image data during a time period, the image quality can have a decreased weight.

Further, the electronic control unit 130 may receive non-image data, such as information from a speedometer 150, sensors 174, navigation unit 140, vehicles within the network 180, remote computer 192, or the like. Such information may include identification of vehicles connected via a mesh network, speed of the vehicle 106 or other vehicles, trajectories or target destinations of vehicles, geographic coordinates, identification of make/model of vehicles, information from third-party services (e.g., navigation services, first responder alerts, construction alerts, weather information, etc.), or the like. The electronic control unit 130 may derive additional information from the image data and non-image data, such as a distance to the obstruction 131, estimated time to pass the obstruction 131, estimated time in which the obstruction 131 will be cleared, a number of vehicles within the environment 100, lanes in which the vehicle 106 may maneuver to decrease time required to pass a traffic condition, or the like. In an example, the electronic control unit 130 may identify a number of vehicles within the environment based on identifying a number of vehicles communicating within the network 180, geographic coordinates provided by vehicles within the network, image recognition from sensors capturing images of vehicles not within the network, and/or estimation of vehicles based on calculating a density of vehicles according to an algorithm that processes a distance to the obstruction 131, a number of lanes, and an average number of vehicles per distance.

The electronic control unit 130 may generate the bird's eye view based at least in part on the image data received from sensors 174. As described herein, the image data may be received from one or more vehicles and/or stationary structures. In examples, the electronic control unit 130 may generate the bird's eye view based on image stitching techniques where captured images are stitched together to form a larger image that is substantially seamless between images. In other examples, the electronic control unit 130 may generate the bird's eye view as a mosaic of various images which may include noticeable seams between images. Moreover, the electronic control unit 130 may generate the bird's eye view as a computer generated graphical image in which actual images are replaced with computer generated graphics. In an example, if the electronic control unit 130 determines that the obstruction 131 is an accident, the electronic control unit 130 may replace or otherwise prevent display of captured images of the accident so as to avoid displaying personal information of those involved in the accident, avoid potentially graphic images, or the like. Further still, the electronic control unit 130 may utilize artificial intelligence or models that may be trained to identify traffic conditions and derive information from image data and non-image data.

In embodiments, the electronic control unit 130 may generate the bird's eye view as animation of current traffic status. For instance, computer generated graphical representations of the road way, vehicles, and the obstruction 131 may be created, where the vehicles may move along the roadway to reflect changing positions. Moreover, the obstruction 131 may change to illustrate progress of clearing or resolving the obstruction 131. In some examples, a progress bar or notification may be provided to indicate progress of clearing the obstruction 131. The electronic control unit 130 may estimate the progress based on comparison of images of the obstruction 131 taken at different time periods, models that may be trained with prior obstructions, or the like.

The electronic control unit 130 may instruct the display component 172 (e.g., HUD, display screen, etc.), to display the generated bird's eye view. In examples, the display device may be located within or part of the vehicle 106. In other examples, the electronic control unit 130 may transmit the generated bird's eye view to other vehicles via the communications unit 170. While the electronic control unit 130 has been described as being part of the vehicle 106, it is noted that the electronic control unit 130 may be part of the remote computing device 192, within the cloud, part of another vehicle, or distributed between vehicles and/or the remote computing device 192.

Figure 3:
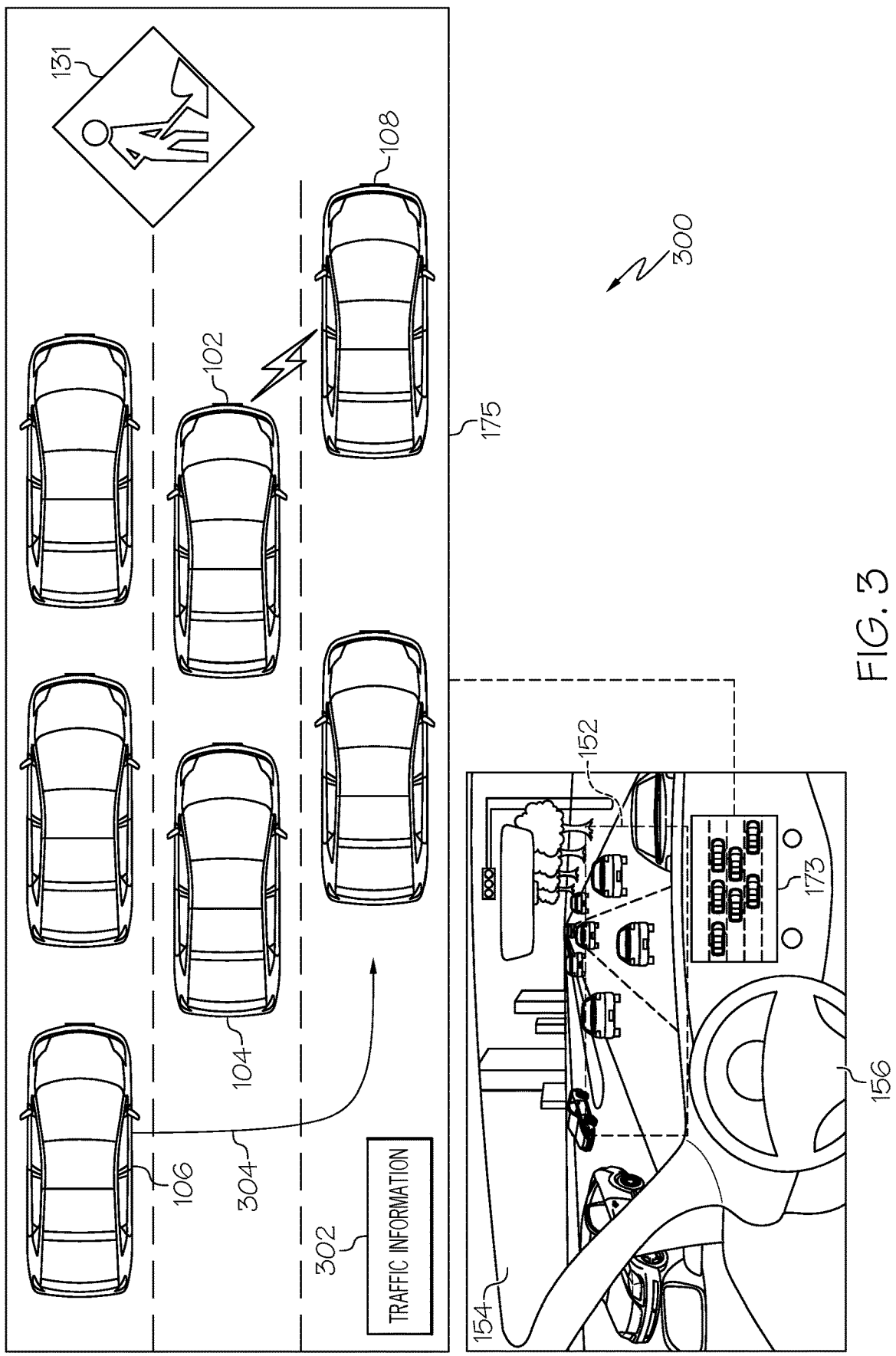
FIG. 3 depicts an illustrative embodiment of a vehicle navigation system for determining and displaying a bird's-eye-view of a traffic jam according to one or more embodiments shown and described herein.

Referring now to FIG. 3 with reference to FIGS. 1 and 2, an illustrative embodiment of a vehicle navigation system 300 for generating and/or displaying a bird's eye view of a traffic jam according to one or more embodiments is shown and described. The vehicle 106 can include a windshield 154, steering wheel 156, and a display device 173 (which may be the display component 172 and/or part of the display component 172) within a cabin of the vehicle 106. The display device 173 may comprise or may be a portion of the display component 172 of FIG. 2.

In embodiments, the display device 173 may comprises a display screen that may render a graphical representation of a bird's eye view 175 of environment 100. The display device 173 may render a roadway, images of vehicles 102, 104, 106, 108 and a graphical representation of the obstruction 131. As described herein, the display device 173 may render the bird's eye view 175 as computer generated graphics, captured images, animations, or the like.

Moreover, the bird's eye view 175 can include traffic information 302 and navigation guidance, such as trajectory 304, which may direct the vehicle 106 to a lane which is not obstructed. The traffic information 302 may include information relative to the traffic jam, such as a number of vehicles, speed, obstructions, type of vehicles (e.g., trucks, ambulances, SUV, motorcycles etc.), identification of vehicles connected via a mesh network, speed of the vehicle 106 or other vehicles, trajectories or target destinations of vehicles, geographic coordinates, information from third-party services (e.g., navigation services, first responder alerts, construction alerts, weather information, etc.), or the like The display device 173 may update the bird's eye view 175 periodically, in real time, or otherwise. For instance, as vehicles pass by the obstruction 131, the bird's eye view 175 may remove vehicles or animate the vehicles to show their passage. In embodiments, updating the bird's eye view 175 can include iterating (e.g., such as by the electronic control unit 130 of FIG. 2), receiving updated image data from sensors of vehicles, and generating updated graphical images of the bird's eye view 175 of the traffic jam based on the update image data.

The vehicle 106 may include a projection display 152 that may comprise a portion of the windshield 154. For instance, images may be projected onto the projection display 152 in combination with or as an alternative to the display device 173. In examples, the traffic information 302, graphical representations of the obstruction 131 and/or vehicles, or other information may be rendered on the display 152.

Figure 4:
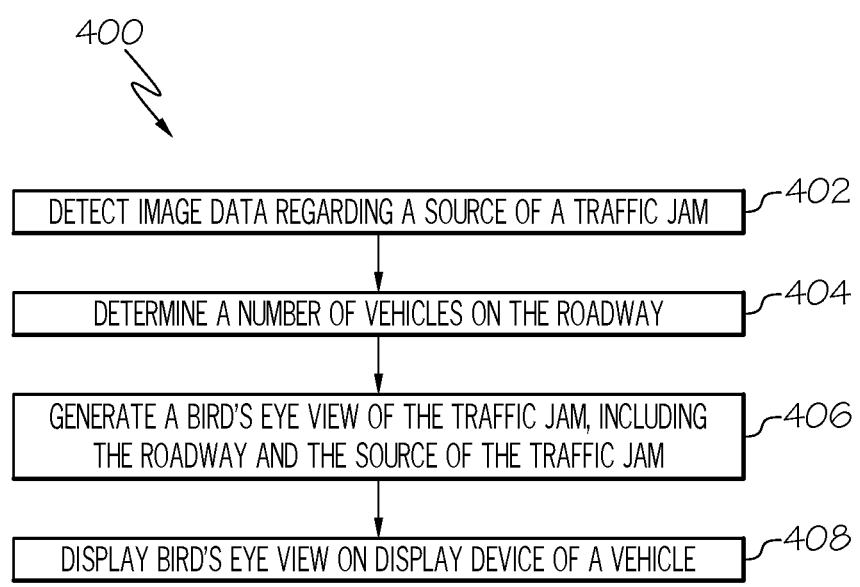
FIG. 4 depicts a flowchart of an example method for displaying a bird's-eye-view of a traffic condition according to one or more embodiments shown and described herein.

In view of the subject matter described herein, methods that may be related to various embodiments may be better appreciated with reference to the flowchart of FIG. 4. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by a vehicle or components thereof, such as the computing device and/or an electronic control unit 130 (e.g., FIG. 2), or the like.

FIG. 4 depicts a flowchart 400 of an example method for displaying a bird's-eye-view of a traffic condition according to one or more embodiments shown and described herein. The following method is described with reference to the components depicted and described in FIGS. 1-3. The method for displaying a bird's-eye-view of a traffic condition may be implemented by computing device or an electronic control unit 130 of the vehicle 106, a remote computing device 192, or a plurality of computing devices. For purposes of explanation, process blocks will be described as being implemented by the vehicle 106. Furthermore, while the method is described with respect to vehicle 106, any number of vehicles or computing devices may utilize the method.

At block 402, the vehicle 106 can receive image data regarding a source of a traffic jam. The image data can be detected by sensors, such as cameras. In examples, the vehicle 106 can receive image data from internal sensors or from sensors of other vehicles, such as firs vehicle 102 (FIG. 1). In examples, the image data may be communicated over a network (e.g., network 180 of FIG. 1).

The vehicle 106 can determine which sensors of the vehicle 106, other vehicles, or stationary structures should be utilized for capturing and receiving images. In at least some embodiments, the vehicle 106 can select which sensors should be utilized for gathering and/or transmitting image data based at least in part on one or more of quality of image data, cleanliness of camera lenses, angles of capture, or the like. In examples, the vehicle 106 selects sensors based on transmission speeds or communication qualities associated with communication components of vehicles or stationary structures. For instance, when two vehicles (e.g., vehicles 102 and 108) can capture image data of the obstruction 131 (FIG. 1), the vehicle 106 may select a vehicle having a highest radio network metric as a target from which to receive image data. The radio network metric may include transmission speed, transmission reliability, or the like. In another example, the vehicle 106 selects sensors 174 from specific vehicles based on quality of images. The quality of images may be determined based on a make/model of a vehicle, cleanliness of a camera lens, angle of capture relative the obstruction 131, image analysis, or the like.

The vehicle 106 can calculate scores according to a weighted model and may select sensors based on the calculated scores. The weighted model may apply weighting factors to weigh specific parameters, such as radio metric performance, an image quality, an angle of view of the source, or a clarity of sensors. The weighted model may be biased and/or trained to apply a greater weight to one or more factors. For instance, in some embodiments, the weighted model may emphasize radio metric performance to increase speed, emphasize image quality, or the like.

At block 404, the vehicle 106 may determine a number of vehicles on the roadway within a traffic jam. Determining the number of vehicles may be based on identification of vehicles within the network, image recognition of vehicles from captured image data, or an estimation algorithm that determines a distance from the vehicle 106 to the obstruction 131 and devices the distance by an estimated space a vehicle takes on the roadway. This may be multiplied by a number of lanes on the roadway. Moreover, the space a vehicle takes may be modified by identified types of vehicles on the roadway.

In embodiments, the vehicle 106 may receive non-image data, such as information from a speedometer 150 (FIG. 2), sensors 174, navigation unit 140, vehicles within the network 180, remote computer 192, or the like. Such information may include identification of vehicles connected via a mesh network, speed of the vehicle 106 or other vehicles, trajectories or target destinations of vehicles, geographic coordinates, identification of make/model of vehicles, information from third-party services (e.g., navigation services, first responder alerts, construction alerts, weather information, etc.), or the like. The vehicle 106 may derive additional information from the image data and non-image data, such as a distance to the obstruction 131, estimated time to pass the obstruction 131, estimated time in which the obstruction 131 will be cleared, a number of vehicles within the environment 100, lanes in which the vehicle 106 may maneuver to decrease time required to a pass traffic condition, or the like. In an example, the electronic control unit 130 may identify a number of vehicles within the environment based on identifying a number of vehicles communicating within the network 180, geographic coordinates provided by vehicles within the network, image recognition from sensors capturing images of vehicles not within the network, and/or estimation of vehicles.

At block 406, the vehicle 106 can determine an obstruction as the source of the traffic jam. Determining the obstruction at the source of the traffic jam can include identifying a traffic condition, such as an accident or construction. Other traffic conditions can include objects on a roadway, such as a disabled vehicle or debris (e.g., objects fallen from vehicles, natural objects such as animals or trees, etc.), or the like. It is further noted that the obstruction 131 can be located in one or more lanes of a roadway, exits of a parking location, or the like.

In embodiments, the vehicle 106 can apply image recognition algorithms, pattern recognition algorithms, or the like to identify objects, signage (e.g., construction signs, first responder signage, etc.), or the like. The vehicle 106 can analyze image data to recognize presence of police, ambulance, or other first responder vehicles from the image data and may determine a likely cause or obstruction that is causing the traffic jam. The vehicle 106 may assign a probability that the identified obstruction as the source based on a confidence score calculated according to a model. In at least some embodiments, the vehicle 106 can utilize artificial intelligence, statistical models, or other processes and/or algorithms to identify objects, traffic situations, or debris, or the like.

At block 408, the vehicle 106 can generate a bird's eye view of the traffic jam, including the roadway and the source of the traffic jam. The bird's eye view can be generated based on image stitching, computer generated images, or the like. In examples, the vehicle 106 may generate the bird's eye view as an animation. In embodiments, the vehicle can generate the bird's eye view of the traffic jam based on the image data and/or non-image data. The bird's eye view includes a graphical representation of the source of the traffic jam, an identification of the number of vehicles on the roadway, and an identification of the obstruction as the source of the traffic jam. It is further noted that the vehicle 106 may display or instruct a display device to display the bird's eye view.

In embodiments, the vehicle 106 may update the bird's eye view periodically, in real time, or otherwise. For instance, as vehicles pass by the obstruction 131, the vehicle 106 may modify the bird's eye view to remove vehicles or animate the vehicles to show their passage. In embodiments, updating the bird's eye view can include iterating (e.g., such as by the electronic control unit 130 of FIG. 2), receiving updated image data from sensors of vehicles, and generating updated graphical images of the bird's eye view of the traffic jam based on the update image data.

Accordingly, described embodiments include systems and methods for generating and displaying a bird's eye view of a traffic jam based on image data captured from vehicles or structures. The bird's eye view can include graphical images of vehicles and a source of a traffic jam. Moreover, the bird's eye view can include traffic condition data, such as a number of vehicles within the traffic jam, speed of vehicles, or the like. The vehicles disclosed herein can display the bird's eye view to a user and a user can have an understanding of the traffic jam.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle navigation system, comprising:
an electronic control unit configured to:
 calculate at least two scores for at least two vehicles of a plurality of vehicles in a mesh network;
 select a target vehicle of the at least two vehicles from which to receive image data regarding a source of a traffic jam on a roadway from a plurality of sensors of the plurality of vehicles, wherein the target vehicle comprises a highest score of the at least two scores;
 receive the image data; and
 generate a bird's eye view of the traffic jam based on the image data, wherein the bird's eye view includes a graphical representation of the source of the traffic jam and a graphical representation of vehicles on the roadway within the traffic jam.

2. The vehicle navigation system of claim 1, wherein the electronic control unit is further configured to instruct a display device to display the bird's eye view.

3. The vehicle navigation system of claim 2, wherein the electronic control unit comprises an electronic control unit of a vehicle of the plurality of vehicles.

4. The vehicle navigation system of claim 1, wherein the electronic control unit is further configured to transmit the bird's eye view to a vehicle of the plurality of vehicles.

5. The vehicle navigation system of claim 2, wherein the electronic control unit comprises a remote electronic control unit.

6. The vehicle navigation system of claim 1, wherein the electronic control unit is further configured to determine a number of vehicles on the roadway within the traffic jam based on the image data and non-image data received from the plurality of vehicles in the mesh network, and wherein the electronic control unit is further configured to instruct a display device to display the bird's eye view and the number of vehicles on the roadway.

7. The vehicle navigation system of claim 1, wherein the electronic control unit is further configured to determine speeds of the plurality of vehicles on the roadway within the traffic jam, and wherein the electronic control unit is further configured to instruct a display device to display the bird's eye view and the speeds of the plurality of vehicles on the roadway.

8. The vehicle navigation system of claim 1, wherein the electronic control unit is further configured to recognize an obstruction as the source of the traffic jam, wherein the obstruction comprises at least one of an accident, construction, or debris on the roadway, and wherein the electronic control unit is further configured to instruct a display device to display the bird's eye view and the obstruction as the source of the traffic jam.

9. The vehicle navigation system of claim 1, wherein the electronic control unit is further configured to calculate the at least two scores based on a weighted model.

10. The vehicle navigation system of claim 9, wherein the weighted model applies weights to at least one of a radio metric performance, an image quality, an angle of view of the source, or a clarity of sensors.

11. A method implemented by a vehicle navigation system, the method comprising:
    calculating at least two scores for at least two vehicles of a plurality of vehicles in a mesh network;
    selecting a target vehicle of the at least two vehicles from which to receive image data regarding a source of a traffic jam on a roadway from a plurality of sensors of the plurality of vehicles, wherein the target vehicle comprises a highest score of the at least two scores;
    receiving the image data;
    determining a number of vehicles on the roadway within the traffic jam based on the image data;
    generating a bird's eye view of the traffic jam based on the image data, wherein the bird's eye view includes a graphical representation of the source of the traffic jam, an identification of the number of vehicles on the roadway, and an identification of an obstruction as the source of the traffic jam; and
    displaying the bird's eye view of the traffic jam on a display device.

12. The method of claim 11, wherein calculating the at least two scores comprises:
    measuring transmission speeds of communication devices of each of the at least two vehicles; and
    calculating the at least two scores based at least in part on the transmission speeds.

13. The method of claim 11, wherein calculating the at least two scores comprises: analyzing clarities of image data captured by each of the at least two vehicles; and calculating the at least two scores based at least in part on the clarities.

14. A vehicle navigation system comprising:
    an electronic control unit configured to:
        calculate at least two scores for at least two vehicles of a plurality of vehicles in a mesh network;
        select a target vehicle of the at least two vehicles from which to receive image data regarding a source of a traffic jam on a roadway from a plurality of sensors of the plurality of vehicles, wherein the target vehicle comprises a highest score of the at least two scores;
        receive the image data;
        receive, via a first sensor, image data of a source of a traffic jam;
        receive, via a second sensor, image data of a portion of the traffic jam a distance from the source, wherein the second sensor is a greater distance from the source of the traffic jam than the first sensor;
        determine an obstruction as the source of the traffic jam based on analysis of the image data of the source; and
        generate a graphical image of a bird's eye view of the traffic jam based on the image data of the source and the image data of the portion of the traffic jam.

15. The vehicle navigation system of claim 14, wherein the electronic control unit is further configured to generate the graphical image of the bird's eye view as a graphical image of the roadway, a graphical image of a target vehicle, and a graphical image of the source of the traffic jam.

16. The vehicle navigation system of claim 15, wherein the electronic control unit is further configured to generate, in response to the obstruction comprising an accident, a token image of the accident as the graphical image of the source of the traffic jam.

17. The vehicle navigation system of claim 14, wherein the electronic control unit is further configured iterate receiving updated image data from the first sensor and the second sensor, and generate updated graphical images of the bird's eye view of the traffic jam based on the update image data.

18. The vehicle navigation system of claim 14, wherein the first sensor comprises a camera of a vehicle, and the second sensor comprises a camera of a stationary structure.

* * * * *

UNITED STATES PATENT AND TRADEMARK OFFICE
CERTIFICATE OF CORRECTION

| | |
|---|---|
| PATENT NO. | : 11,804,132 B2 |
| APPLICATION NO. | : 17/344277 |
| DATED | : October 31, 2023 |
| INVENTOR(S) | : Mikio David |

It is certified that error appears in the above-identified patent and that said Letters Patent is hereby corrected as shown below:

In the Specification

In Column 5, Line(s) 15, after "sensors", delete "for" and insert --to--, therefor.

In Column 9, Line(s) 3, delete "comprises" and insert --comprise--, therefor.

In Column 10, Line(s) 5, delete "firs" and insert --first--, therefor.

In the Claims

In Column 14, Line(s) 31, Claim 17, after "configured", insert --to--.

In Column 14, Line(s) 34, Claim 17, delete "update" and insert --updated--, therefor.

Signed and Sealed this
Twelfth Day of March, 2024

Katherine Kelly Vidal
*Director of the United States Patent and Trademark Office*